US012630027B2

(12) United States Patent
McCay et al.

(10) Patent No.: US 12,630,027 B2
(45) Date of Patent: May 19, 2026

(54) eTELLIGENT LO RANGE CONTROL FOR AN ELECTRIC VEHICLE

(71) Applicant: Magna Powertrain of America, Inc., Troy, MI (US)

(72) Inventors: Lee McCay, Windsor (CA); Jeffrey Botticello, Madison Heights, MI (US); William Lawrie, Madison Heights, MI (US)

(73) Assignee: Magna Powertrain of America, Inc.

( * ) Notice: Subject to any disclaimer, the term of this patent is extended or adjusted under 35 U.S.C. 154(b) by 69 days.

(21) Appl. No.: 18/673,675

(22) Filed: May 24, 2024

(65) Prior Publication Data

US 2024/0399886 A1 Dec. 5, 2024

Related U.S. Application Data

(60) Provisional application No. 63/504,825, filed on May 30, 2023.

(51) Int. Cl.
B60L 15/20 (2006.01)

(52) U.S. Cl.
CPC .......... B60L 15/20 (2013.01); B60L 15/2063 (2013.01); *B60L 2240/12* (2013.01); *B60L 2240/423* (2013.01); *B60L 2240/642* (2013.01); *B60L 2250/28* (2013.01); *B60L 2260/20* (2013.01)

(58) Field of Classification Search
None
See application file for complete search history.

(56) References Cited

U.S. PATENT DOCUMENTS

| | | | |
|---|---|---|---|
| 7,988,593 B2 | 8/2011 | Staub et al. | |
| 9,950,640 B2 * | 4/2018 | Lai | B60L 50/10 |
| 10,960,882 B2 * | 3/2021 | Ruybal | B60W 20/10 |
| 11,932,117 B2 * | 3/2024 | Wang | B60W 30/045 |
| 2016/0031431 A1 | 2/2016 | Johri et al. | |

* cited by examiner

*Primary Examiner* — Todd Melton
(74) *Attorney, Agent, or Firm* — Dickinson Wright PLLC

(57) ABSTRACT

A method for operating an electric vehicle for traversing off-road terrain includes operating the vehicle both in a normal operating mode and an electric low range operating mode. A control unit receives inputs from sensors that determine vehicle operating conditions, such as vehicle speed, grade of terrain, accelerator position, and brake pedal position. The method adjusts motor torque or the maximum allowable motor as a function of the determined vehicle operating conditions, to provide improved electric vehicle operation in a low range mode, including the increasing motor torque at different rates relative to the normal mode, allowing a greater maximum allowable torque, increasing torque to overcome obstacles, and increasing torque to ascend or descend.

15 Claims, 7 Drawing Sheets eTELLIGENT LO RANGE CONTROL FOR AN ELECTRIC VEHICLE

CROSS-REFERENCE TO RELATED APPLICATIONS

This application claims the benefit of previously filed U.S. Provisional Patent Application No. 63/504,825, filed May 30, 2023, the entire content of which is hereby incorporated by reference in its entirety.

FIELD

The present disclosure relates generally to methods of controlling vehicles powered by an electric drive module for improved off road performance. More particularly, the present disclosure is directed to a control method of the electric drive module where the response of the electric drive module to driver input is altered to provide a vehicle with improved driveline response and improved low vehicle speed performance over various off-road terrains.

BACKGROUND

This section provides general background information related to electric vehicles and electric powertrain configurations arranged to drive one or more pairs of ground-engaging wheels. However, this background section is not necessarily prior art to the inventive concepts associated with the present disclosure.

The automotive industry is committed to development of alternative powertrains in an effort to reduce exhaust emissions associated with conventional powertrains equipped with an internal combustion engine. Much of the recent development activity has been directed toward electric vehicles (EV) equipped with one or more electric traction motors powered by electric energy stored in an array of on-board battery packs.

Various alternative electric powertrain configurations are currently under development. For example, electric drive axle assemblies have now been developed to replace otherwise conventional drive axle assemblies in vehicles that often traverse off-road terrain. The electric drive axle assembly is typically configured to include an electric motor, a final drive unit including a differential assembly, a gear reduction unit operably coupling the electric motor to the final drive unit, and a pair of axle shafts interconnecting the differential assembly to a pair of ground-engaging wheels. These electric drive assemblies can be applied to independent suspension systems in a 3 in 1 configuration or in an electric beam axle configuration. These electric drive assemblies can also be utilized to provide additional electric propulsion to powertrains with internal combustion engines to provide a hybrid vehicle. Such electric propulsion can be integrated into the transmission, known in the industry as a P2 hybrid arrangement, or as a standalone electric drive assembly in addition to the primary powertrain, known as a P4 hybrid arrangement. The electric drive axle assembly may further include an axle housing assembly configured to include a motor housing supporting the electric motor, a differential housing supporting the final drive unit, and a pair of axle tubes supporting the pair of axle shafts. The gear reduction unit can be a lay shaft configuration or a planetary configuration of combination thereof for the purpose of providing a desired speed reduction and torque multiplication between the electric motor and the final drive unit. As an electric motor can generate maximum output torque at low vehicle speeds and has a high maximum operating speed characteristic, the electric drive axle assembly often utilizes a single-speed axle that is adapted to drive either the front wheels and/or the rear wheels of the vehicle.

A traditional internal combustion engine with an automatic transmission will have a creep speed or idle creep which is the default speed that a vehicle will move, driven by a creep torque, when the transmission is in a drive mode and the operator's foot is taken off the brake pedal, but the accelerator pedal is not depressed. This behavior is due to torque converter or clutch(es) of the transmission and is not present in an electric drive module. Many traditional internal combustion engine powered vehicles which traverse off road terrain further include a transfer case which provides an additional gear reduction, improving ICE torque output to the driveline via additional torque multiplication gear ratio (known as "low range" or 4×4 Low). Utilizing low range increases creep torque and overall torque output in drive conditions and increases engine braking torque during coast conditions. This allows an ICE engine with low range to traverse terrain at reduced engine speeds because of the low range torque multiplication. When the accelerator pedal is not applied and engine is at idle speed, the ICE vehicle due to a torque converter in an automatic transmission and the low range of the transfer case may have enough torque to climb inclines without any accelerator pedal input or need to increase engine torque as well as provide improved speed control due to higher levels of engine braking on descents and minimize number of driver brake applications. Low range also allows for improved two-pedal driving capability to allow simultaneous application of gas and brake pedal to give fine control over difficult obstacles.

In view of operating these single speed electric powertrains to traverse off road terrain, a recognized need exists to develop improved control systems to provide optimized power and tractive delivery characteristics like an ICE powered vehicle with low range when operating in these conditions.

SUMMARY

This section provides a general summary of the many aspects associated with the inventive concepts embodied in the teachings of the present disclosure and is not intended to be considered a complete listing of its full scope of protection nor all of its features and advantages.

In view of the above, it is an aspect of the disclosure to provide improved control algorithms of an electric vehicle to provide a "virtual low range" or "virtual 4×4 Low" which will operate as further described, and referred to herein collectively as eTelligent LO. These algorithms provide additional safety by reducing the risk of downhill overspeed and required brake applications, increase marketability potential to offer a 'Low Range' in electric vehicles without the need for additional mechanical hardware, and increase the ability for novice or unskilled drivers to navigate complex off-road obstacles. If a two-speed gear reduction system is included in an electric drive axle assembly, some of the effects of the proposed algorithm may be realized without the need of the overall algorithm, but other portions of the algorithm could be applicable and provide for improved functionality.

It is an aspect of the present disclosure to provide a method of operating a vehicle in an eTelligent LO mode to provide better control and performance to traverse over off-road terrain It is an aspect of the present disclosure to provide a method of operating vehicle with an electric motor providing propulsion in an eTelligent LO mode to provide better control and performance to traverse off-road terrain It is an aspect of the present disclosure to provide a method of operating an electric-only vehicle in an eTelligent LO mode that mimics and improves upon the benefits of a traditional ICE powered vehicle with "low range" or "4×4 Low"

It is a related aspect of the present disclosure to provide a method of operating an electric-only vehicle in an eTelligent LO mode, including increasing a fidelity of torque output, dependent on accelerator input, of one or more electric motors relative to a normal mode, resulting in better control of the electric vehicle to traverse over off-road terrain.

It is a related aspect of the present disclosure to provide a method of operating an electric-only vehicle in an eTelligent LO mode, including decreasing the electric vehicle's creep speed and increasing the creep torque relative to a normal mode, when the brake and accelerator are not pressed, providing increased power to the electric vehicle for traversing off-road terrain.

It is a related aspect of the present disclosure to provide a method of operating an electric-only vehicle in an eTelligent LO mode, including increasing the allowable driveline torque relative to a normal mode, when the brake pedal is activated, resulting in improved control of the electric vehicle over off-road terrain.

It is a related aspect of the present disclosure to provide a method of operating an electric-only vehicle in an eTelligent LO mode, including providing a grade compensation creep torque resulting in better control of the electric vehicle over off-road terrain It is a related aspect of the present disclosure to provide a method of operating an electric vehicle in an eTelligent LO mode, including providing an obstacle compensation torque, based on time below a target minimum creep speed, to one or more electric motors.

It is a related aspect of the present disclosure to utilize these various methods together or separately on individual or multiple drivelines of the electric vehicle in a manner that will provide the desired vehicle performance in traversing off road terrains.

These and other features and advantages of the present disclosure will become more readily appreciated when considered in connection with the following detailed description and the drawings.

BRIEF DESCRIPTION OF THE DRAWINGS

The drawings described herein are for illustrative purposes only of selected embodiments and are not intended to limit the scope of the present disclosure. The concepts associated with the present disclosure will be more readily understood by reference to the following description in combination with the accompanying drawings wherein.

DETAILED DESCRIPTION

Example embodiments for a method of controlling an electric vehicle equipped with electric drive axle assemblies specifically for traversing off road terrain are provided so that this disclosure will be thorough and fully convey the scope of the concepts associated with the present disclosure to those who are skilled in the art. Numerous specific details are set forth, such as examples of specific configurations and functionality of certain components and related methods of operation, to provide a clear understanding of various non-limiting embodiments of the present disclosure. It will be apparent to those skilled in the art that all specific details need not be employed, that example embodiments may be configures in many different forms, and that neither should be construed to limit the scope of the concepts associated with this disclosure.

As a primary example, a fully electric powertrain configuration will be described in FIG. 1. The methods described may also be utilized in vehicles which are not solely electrically powered. Such electric propulsion can be integrated into the transmission, known in the industry as a P2 arrangement, or as a standalone electric drive assembly in addition to the primary powertrain, known as a P4 arrangement as non-limiting examples. In these example hybrid applications, the additional electric propulsion provided in the hybrid vehicle may be operated in certain conditions in an electric only propulsion mode. In these electric only propulsion modes, the eTelligent LO control algorithm and methods could also be utilized with similar benefits as primarily described being utilized in a fully electrically powered vehicle of this disclosure.

Figure 1:
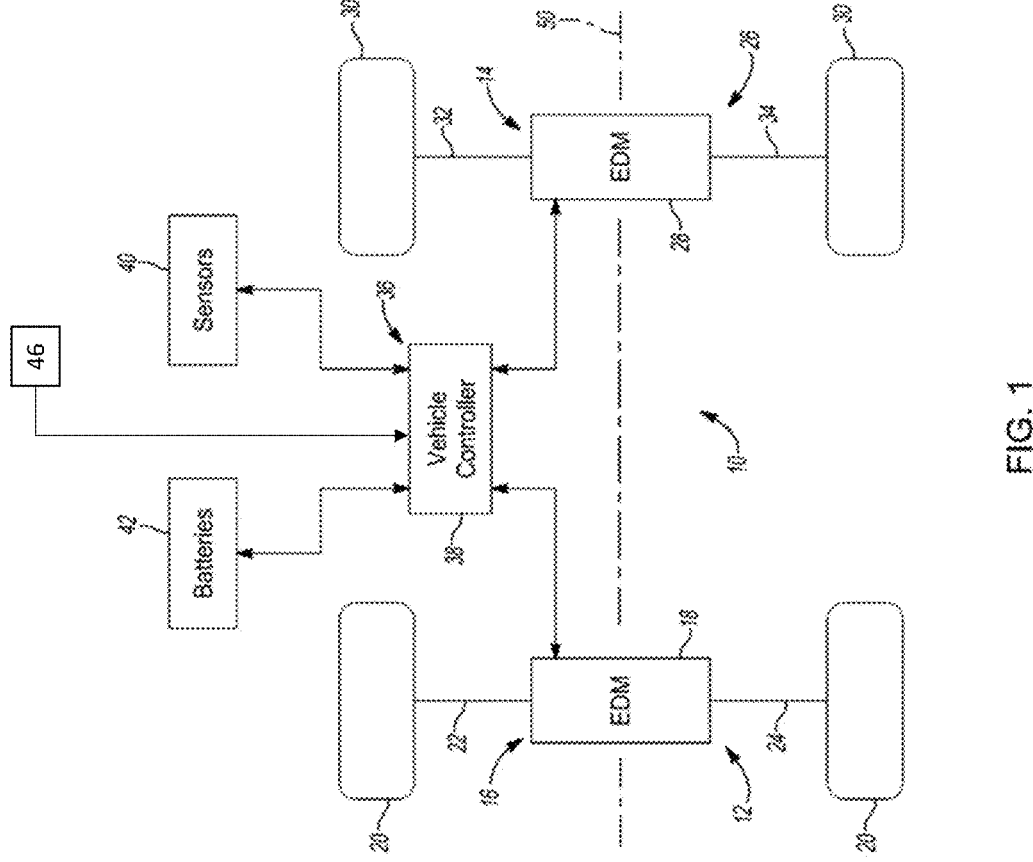
FIG. 1 is a diagrammatical illustration of an electric powertrain configuration and a vehicle control system associated with an electric vehicle being constructed in accordance with the teachings of the present disclosure.

Referring initially to FIG. 1, an exemplary electric powertrain configuration for an electric vehicle 10 is shown schematically to include a first powered driveline 12 and a second powered driveline 14. First powered driveline 12 is shown as a front driveline having a front electric drive axle assembly 16 configured to include a front electric drive module (EDM) 18 operatively coupled to drive a pair of ground-engaging front wheels 20 via a pair of front axle shafts 22 and 24. Second powered driveline 14 is shown as a rear driveline having a rear electric drive axle assembly 26 configure to include a rear electric drive module (EDM) 28 operably coupled to drive a pair of ground-engaging rear wheels 30 via a pair of rear axle shafts 32 and 34. Optionally the configuration for electric vehicle 10 may utilize only a single powered driveline, most likely providing power to the ground engaging rear wheels 30. The control methods proposed in this disclosure can be utilized in any electric vehicle 10 configuration whether front wheel driven, rear wheel driven, or all wheel driven. Electric vehicle 10 also includes a vehicle control system 36 which is schematically shown, in this non-limiting configuration, to include a vehicle controller 38, a plurality of vehicle sensors 40 and an array of batteries 42. Vehicle controller 38 is intended to identify and represent one or more electronic control units configured to receive input sensor signals from vehicle sensors 40 and electrical power from batteries 42, and which function cooperatively to control actuation of the electrically powered devices associated with front EDM 18 and rear EDM 28. Within vehicle controller 38, the control algorithm for eTelligent LO Range Control 44 (FIG. 2) will reside, which may be implemented when the operator selects eTelligent LO mode via a switch 46 or other HMI in preparation of traversing an off-road terrain. Front electric drive axle assembly 16 and rear electric drive axle assembly 26 are shown to be aligned relative to a longitudinal centerline 50 of vehicle 10. In addition, front axle shafts 22 and 24, along with front wheels 20, are aligned for rotation about a first lateral axis while rear axle shafts 32 and 34, along with rear wheels 30 are aligned for rotation about a second lateral axis.

Figure 2:
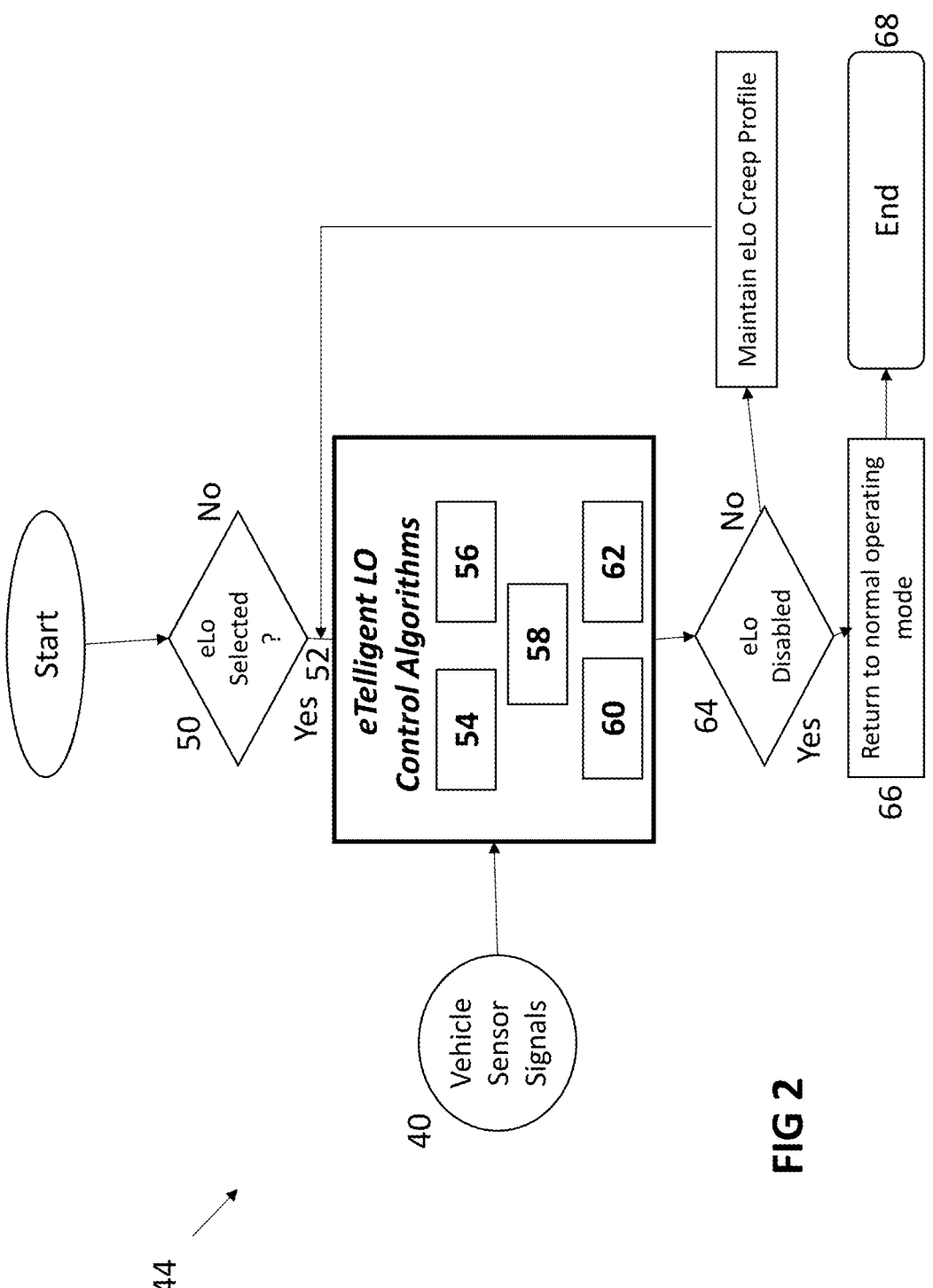
FIG. 2 is the overall control algorithm for eTelligent LO.

In FIG. 2, an example overall control algorithm 44 for eTelligent LO, which may also be referred to as an electric low range operating mode, is shown, which improves the vehicle capability of traversing off-road terrain in electric vehicle 10. Control algorithm 44 may reside in vehicle controller 38, stored in memory of the controller 38, and operate based on signals received at the controller 38 from sensors 40 of the vehicle. These sensors 40 can detect various vehicle conditions, as described in the following (but are not limited to the following conditions). For instance, a vehicle reference speed may be calculated/detected by wheel speed sensors, sensors of other rotating components within the first powered driveline 12 or second powered driveline 14, as well as inputs from other vehicle sensors. Accelerator pedal position and brake pedal variable position may also be detected and utilized. A further calculated algorithm, based on input from sensors 40, may be used to determine an estimated grade or incline/decline the off-road terrain electric vehicle 10 is traversing. The grade estimate may be based on inputs from the vehicle's longitudinal accelerometer. A mass estimate of the electric vehicle 10 may be computed from longitudinal acceleration and the estimated driveline torque produced by electric drive axle assemblies 16 and 26.

As shown in FIG. 2, at step 50, the operator may enter the "virtual low" mode by selecting eTelligent LO mode via a switch 46 or other HMI in preparation of traversing an off-road and, by activating control algorithm 44, the method modifies the output torque of first powered driveline 12 and/or second powered driveline 14, based upon multiple control algorithms 54, 56, 58, 60, 62 and profiles, utilizing inputs from sensors 40. In one aspect, a preferred method includes operating both drivelines in the same manner, based on the eTelligent LO control algorithm 44. However, it is also provided that a different variety of algorithms or various tuning of the algorithms between the front powered driveline 12 and the rear powered driveline 14 may be beneficial for vehicle performance based on the particular driving situation that the electric vehicle 10 encounters. For instance, situations may arise and be detected where there is a traction and/or torque capacity difference between front and rear drivelines, significant and sudden transitions in grades, and/or consideration for steering wheel input.

In one aspect, a first algorithm profile 54 increases the fidelity of the torque output ratio dependent on accelerator input. A second algorithm profile 56 decreases the vehicles creep speed and increases creep torque when brake and accelerator pedal are not pressed. A third algorithm profile 58 increases allowable driveline torque when the brake pedal is activated for a given accelerator pedal position. A fourth algorithm profile 60 provides for a grade compensation torque. A fifth algorithm profile 62 provides an obstacle compensation torque, based on a comparison of actual vehicle speed to expected creep speed over a predicted time. These algorithm profiles will be described in more detail in the description of later figures, and all or portions of these algorithms may be utilized together or separately when in the eTelligent LO mode. Electric vehicle 10 will maintain operation in eTelligent LO 44 mode until the operator disables operation, at step 64, or a default method of operation is selected, returning electric vehicle 10 to a normal operating mode at step 66, where the method 44 ends at step 68 until eTelligent LO mode is selected again at step 50.

Figure 3:
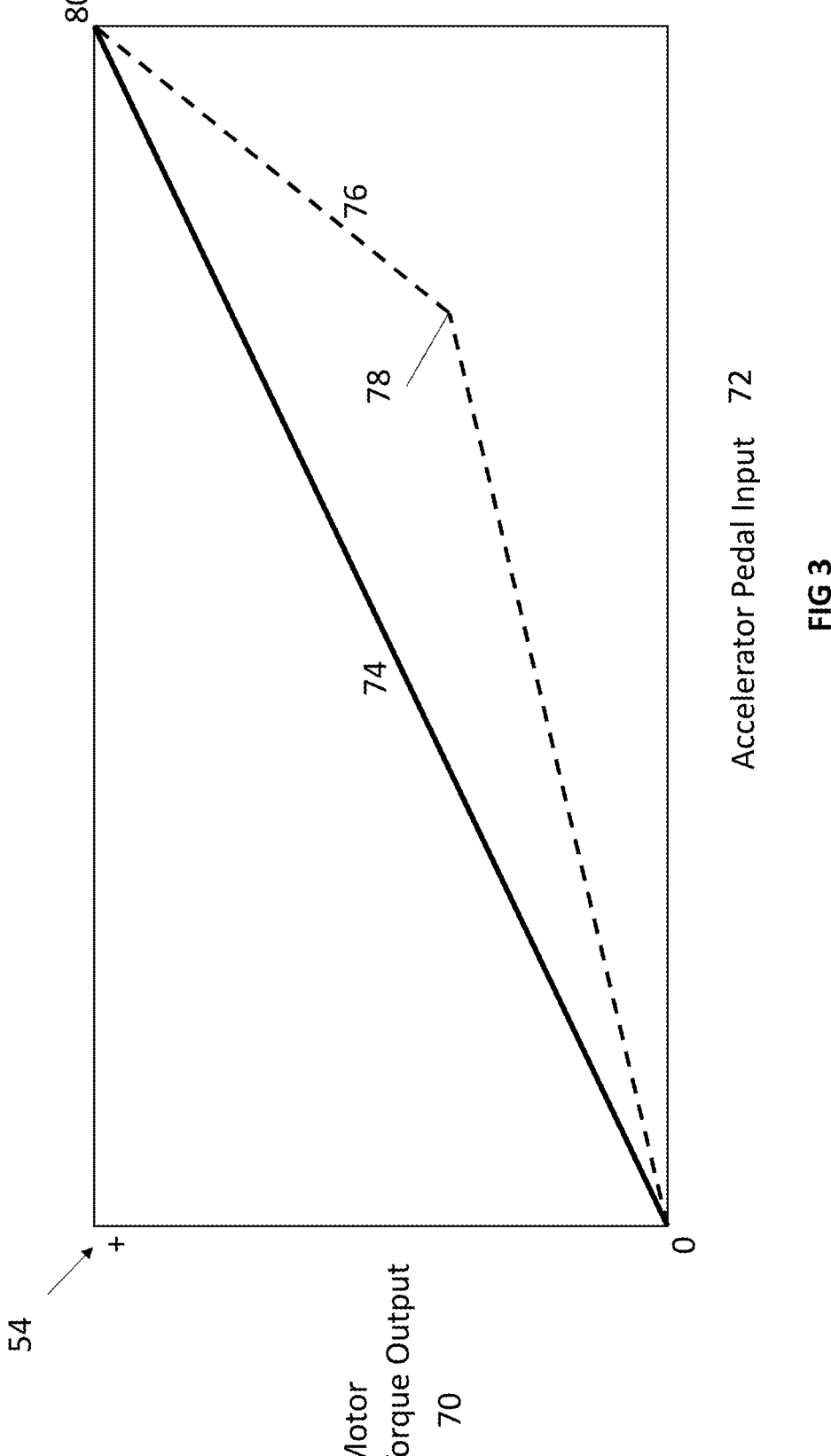
FIG. 3 shows an example mapping for increasing the fidelity of the torque output ratio dependent on accelerator input.

With reference now to FIG. 3, the first algorithm profile 54 of the eTelligent LO mode control algorithm 44 is depicted, showing an example of a revised mapping on motor output torque 70 from an electric drive module, which is modified or changes based on accelerator pedal position 72. The motor torque output torque profile shown in FIG. 3 is illustrated in comparison to the motor torque output that occurs in normal operation when the LO mode is not activated. In the normal operating state, illustrated via torque output profile 74, the relationship generally increases linearly between the driver accelerator input 72 and motor output torque 70. In contrast to the normal operating state, in eTelligent LO mode 76, an increase in fidelity of the motor torque output 70 relative to accelerator pedal input 72 is provided. This allows the operator to increase accelerator pedal input 72 while increasing the motor output torque 70 at a lower rate (shown via output profile 76) relative to the normal operating state and output profile 74, thereby resulting in improved control of electric vehicle 10 at low pedal demands over off-road terrain. In one aspect, as shown via output profile 76, the profile of eTelligent LO has a transition point 78, which provides the driver with the ability to increase motor output torque at a faster rate as the accelerator pedal input 72 increases towards its maximum value, because often this is the driver's response when attempting to overcome a steeper incline or more substantial obstacle off road. As shown via profile 76, following transition point 78, the rate of increase of the torque 70 relative to the pedal input 72 is actually higher than the rate of the normal output profile 74, such that output profile 76 begins to approach output profile 74. When accelerator pedal position 72 reaches a maximum, for example, at point 80, the motor output torque 70 is shown as being equivalent between normal operating mode output profile 74 and eTelligent LO mode output profile 76. However, it will be appreciated that the torque outputs 70 for each profile 74 and 76 could still be different when the accelerator is at a maximum.

Figure 4:
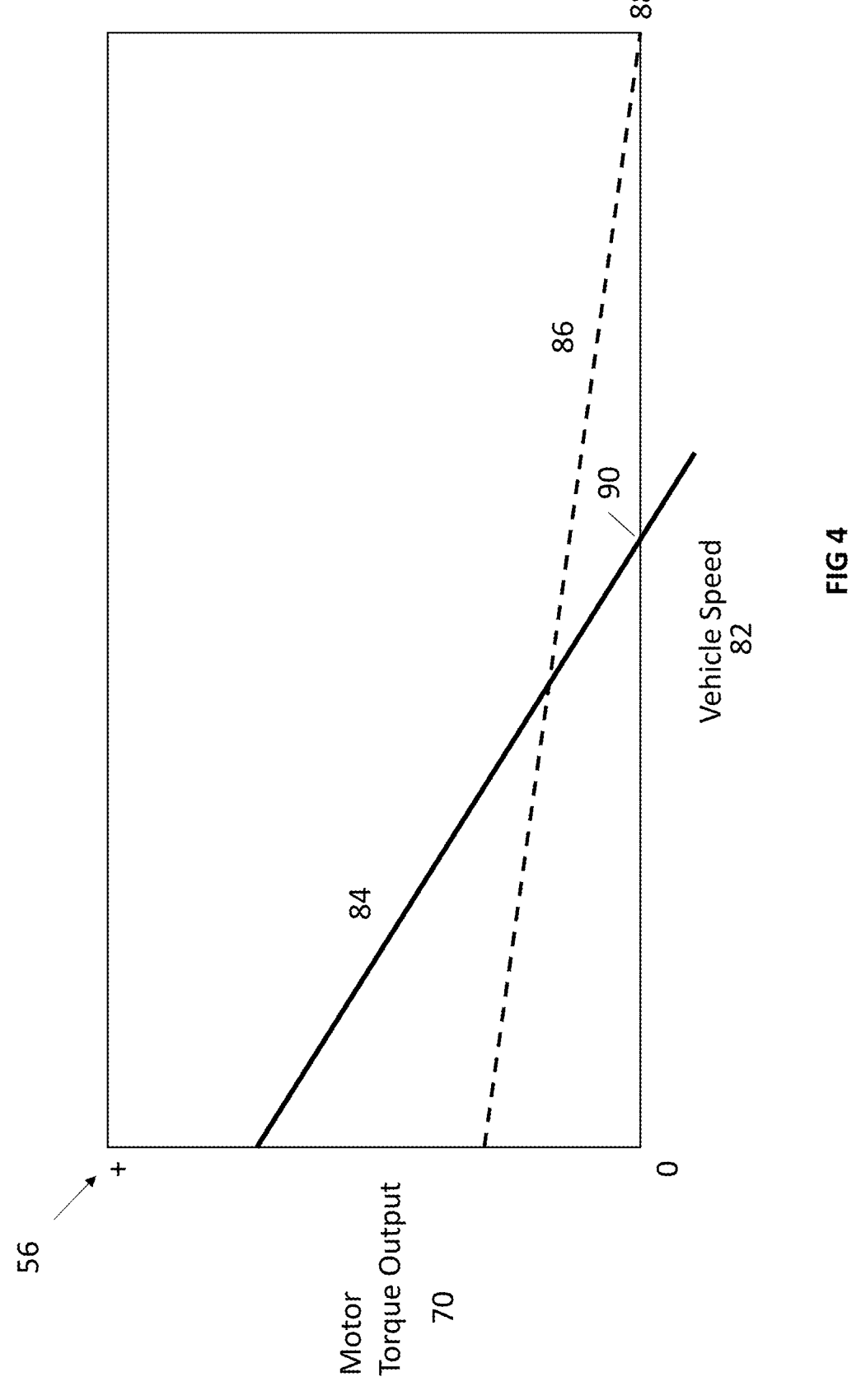
FIG. 4 shows an example mapping for decreasing the vehicles creep speed and increasing creep torque when brake and accelerator pedal are not pressed.

With reference now to FIG. 4, the second algorithm profile 56 of eTelligent LO mode 44 is depicted in FIG. 4, showing motor output torque 70 varying across a range of vehicle speed 82 when in the eTelligent LO mode via output profile 84, as compared to the normal operating mode output profile 86. These profiles illustrate the output when the accelerator pedal and the brake pedal position are at zero or not activated by the driver (similar to idle or creep for ICE). In this "idle" condition, electric vehicle 10 will normally be provided a motor output torque 70 which allows for the vehicle to creep or slowly move even without application of accelerator pedal. This is meant to mimic the functionality of a traditional ICE powered vehicle with a transmission and torque converter and, as shown in normal mode 86, this may be a linear relationship decaying towards zero at a given vehicle speed as shown at point 88. To improve off-road performance, when eTelligent LO mode control algorithm 44 is selected, the characteristic output profile of motor output torque 70 changes by providing a higher motor output torque 70 at a reduced vehicle speed. The decay rate of the motor output torque 70 according to output profile 84 decreases at a greater rate, reducing the torque to zero at point 90 (which occurs at a lower vehicle speed relative to the normal operating mode as shown via output profile 86 at point 88), and the algorithm 44 may even provide a negative motor output torque 70 to help assist in preventing an overspeed vehicle condition. This second algorithm 56 allows for the electric vehicle 10 to provide more power to ground engaging wheels 20 and 30 during lower vehicle speed than in the normal mode operation (shown via profile 86) allowing for easier operating over off-road terrain.

Thus, for example, in the normal operating mode when operating on a smooth surface, at a lower vehicle speed when the brake and accelerator are not operated (driver lifts foot off pedals, for example), the motor torque output 70 is at a first level, which may drive the vehicle at "idle" type speeds. As the speed increases as a result of this torque, the torque demand reduces linearly and the motor torque output therefore reduces. As the vehicle speed continues to increase to a maximum idle speed, for example, the torque demand will reduce to zero. It can be appreciated that by reducing torque to zero, the zero may begin to decelerate, whereby the torque demand will therefore be present again due to this lower speed.

A similar operation may be present when the algorithm 44 is activated. The difference is that in an off-road condition, a greater torque may be necessary to get the vehicle moving to an "idle" type operation. The torque demand can reduce more rapidly as the vehicle speeds increases in response to the torque being provided, with the torque reducing to zero at a lower speed, which is desirable for off-road conditions. Additionally, as described above, in the event the vehicle speed increases beyond a given point 90, the torque output can actually be negative to slow the vehicle.

Figure 5:
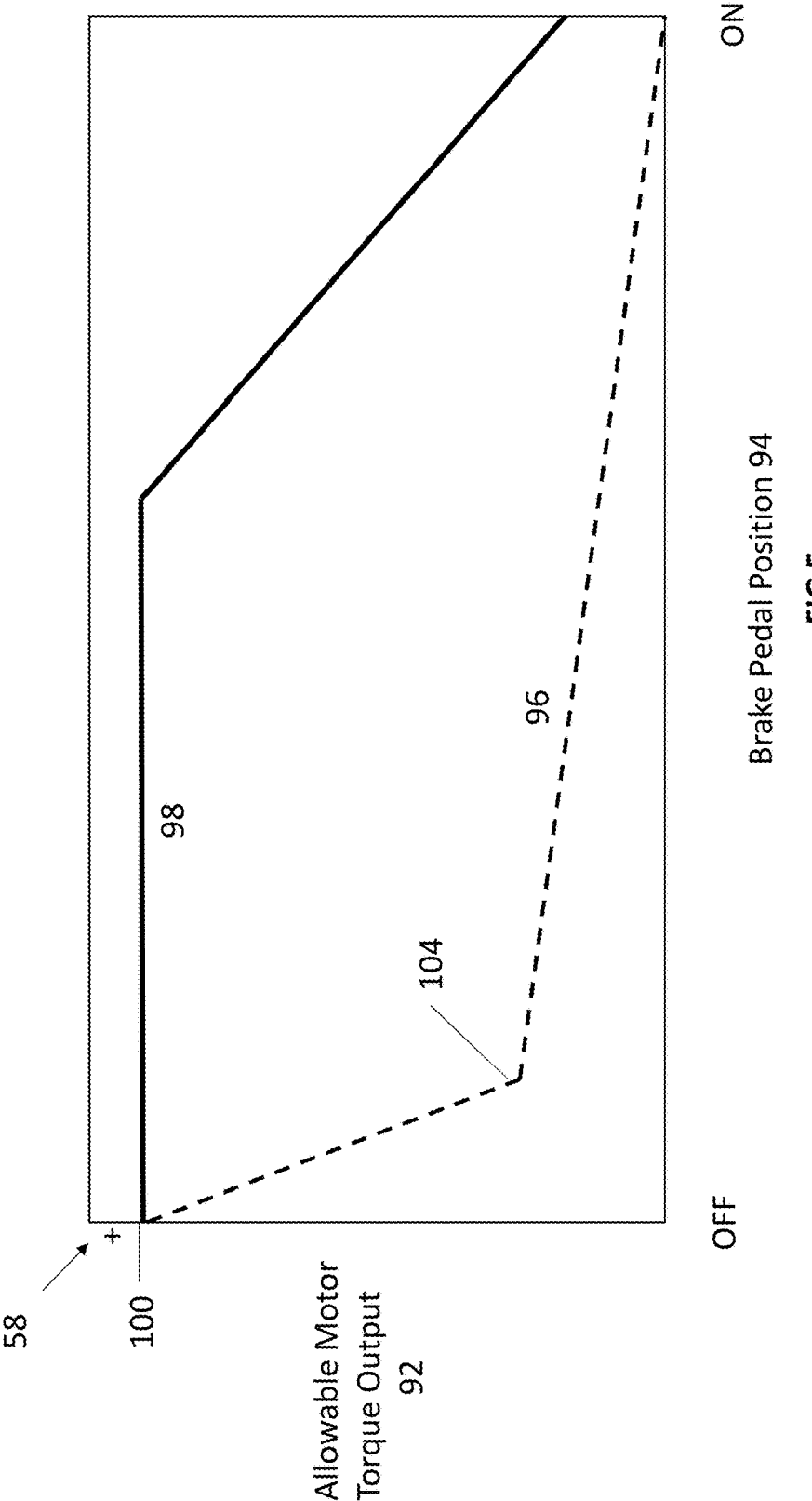
FIG. 5 shows an example mapping for increasing allowable driveline torque when the brake pedal is activated for a given accelerator pedal position.

With reference now to FIG. 5, the third algorithm profile 58 of eTelligent LO mode 44 is depicted. FIG. 5 shows an example of the allowable motor output torque 92, where the torque output changes based on a brake pedal position 94, comparing the normal operating mode allowable torque output profile 96 and eTelligent LO mode allowable torque output profile 98, based on a given accelerator position. Brake pedal position 94 may be defined as pressure applied to the pedal, or the travel of the pedal and not simply defined as either "off" or "on". As shown in FIG. 5, during a normal operating mode, shown via profile 96, and the eTelligent LO mode, shown via profile 98, the allowable motor output torque 92 is an equivalent value when brake pedal position 94 is off or not engaged by the driver (illustrated at point 100). This position and equivalency allows for the motor torque 92 that is produced by electric drive axle assemblies 16 and 26 to be the same under both normal and eLO operating states. The eTelligent LO output profile 98, when operating according to control algorithm 44, illustrates a higher allowable motor output torque 92 (relative to the normal mode shown via profile 96) across an increased range of brake pedal position 94, with the allowable motor output torque 92 staying constant from the brake pedal off position and through initial brake pedal travel, and then decreasing once the brake pedal travel/position reaches a point indicating that the driver is requesting a nearly full engagement of the brakes. Optionally, the allowable motor output torque 92 in eTelligent LO mode, shown via profile 98, when the brake is fully engaged can be at a value greater than zero as shown at point 102 (meaning that the torque may still be applied even when the brake is fully actuated), or the maximum allowable toque decrease fully to zero, equivalent to zero torque allowed in the normal operating mode at full brake pedal actuation, shown via profile 96 (meaning that torque will not be applied when the brake is fully actuated). These relationships can be tuned or calibrated based on the requirements of the vehicle and its operation. During normal operating mode shown via profile 96, the allowable motor torque 92 quickly reduces from its initial maximum (at point 100) towards point 104 as the brake pedal 94 is engaged and the brake pedal position increases from the off position. This is a preferred operation during normal circumstances, because reducing the maximum motor output torque when the brake is engaged is logical to immediately assist in slowing the vehicle down. At point 104, the rate of the decrease of the allowable motor torque may be reduced, while still approaching zero.

The algorithm 58 shown in FIG. 5, however, provides for improved two-foot driving, where a driver may be applying the brake and accelerator together or in very close succession, in an attempt to overcome obstacles encountered in off-road terrain while maintaining control of the vehicle in an ascent or decent. Without the allowable motor output profile 98 of algorithm 58, there is the potential that any requests of increased motor torque via application of the accelerator pedal would be canceled due to the reduction of motor torque based on the application of the brake, and would result in difficult control of electric vehicle 10. Thus, even when the brake pedal is actuated, up to a given point of travel, the allowable motor torque output will remain relatively high, at least higher than the allowable motor torque output for the same brake pedal travel when operating under the normal operating mode.

Figure 6:
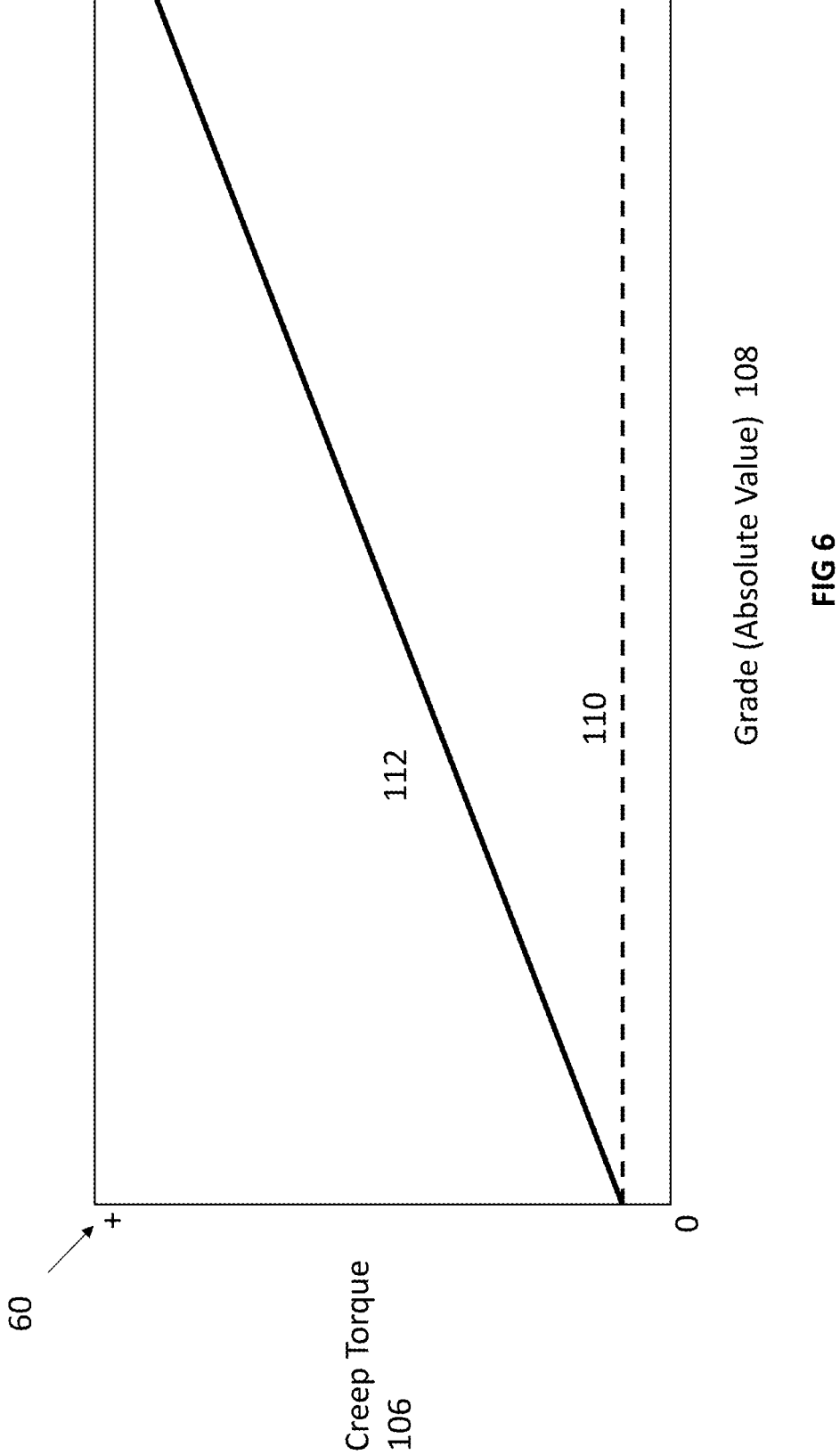
FIG. 6 shows an example mapping for a grade compensation torque.

FIG. 6 illustrates the fourth algorithm profile 60 of the eTelligent LO mode control algorithm 44. FIG. 6 shows an example of adjusting creep torque 106 relative to grade 108 to provide grade compensation, and shows how creep torque 106 is modified based on grade 108, comparing the creep torque output profile 110 for the normal operating mode with the eTelligent LO mode creep torque output profile 112. The value of the grade 108 may be based on inputs from the longitudinal accelerometer within electric vehicle 10 to determine if the electric vehicle 10 is ascending or descending off-road terrain. When in eTelligent LO mode, shown via profile 112, the creep torque 106, which is a motor output torque produced by electric drive axle assemblies 16 and/or 26 and provided to ground engaging wheels 20 and/or 30, is significantly increased when compared to the creep torque output during normal operation, shown via profile 110, as grade 108 increases as an absolute value. During normal operation, shown via profile 110, the creep torque remains generally the same at different grades 108. During the eLO mode, shown via profile 112, the creep torque output increases as the grade 108 increases. This increasing in creep torque 106 as the grade 108 increases ensures electric vehicle 10 can continue to move up the grade 108 at a controlled speed without the need for additional driver accelerator input to maintain movement. In the normal operating mode, illustrated via profile 110, without grade compensation, there is the potential the grade becomes too steep and the electric vehicle 10 comes to a stop or the driver needs to carefully modulate the accelerator input accordingly to maintain a controlled speed due to the increased grade 108. The fourth algorithm 60 is also beneficial when the grade is negative, or during descent, because a negative torque can similarly be provided by the electric drive axle assemblies 16 and/or 26 controlling the speed of electric vehicle 10 without the need for additional brake intervention. Thus, the illustration of FIG. 6 applies to both positive and negative grades. According to the eLO profile 112 of the creep torque, as the grade increases, the creep torque increases. For negative grades, as the negative grade increases (becomes more steep), a corresponding negative torque increases to slow the vehicle downward acceleration and keep the vehicle moving at a low speed, for example.

Figure 7:
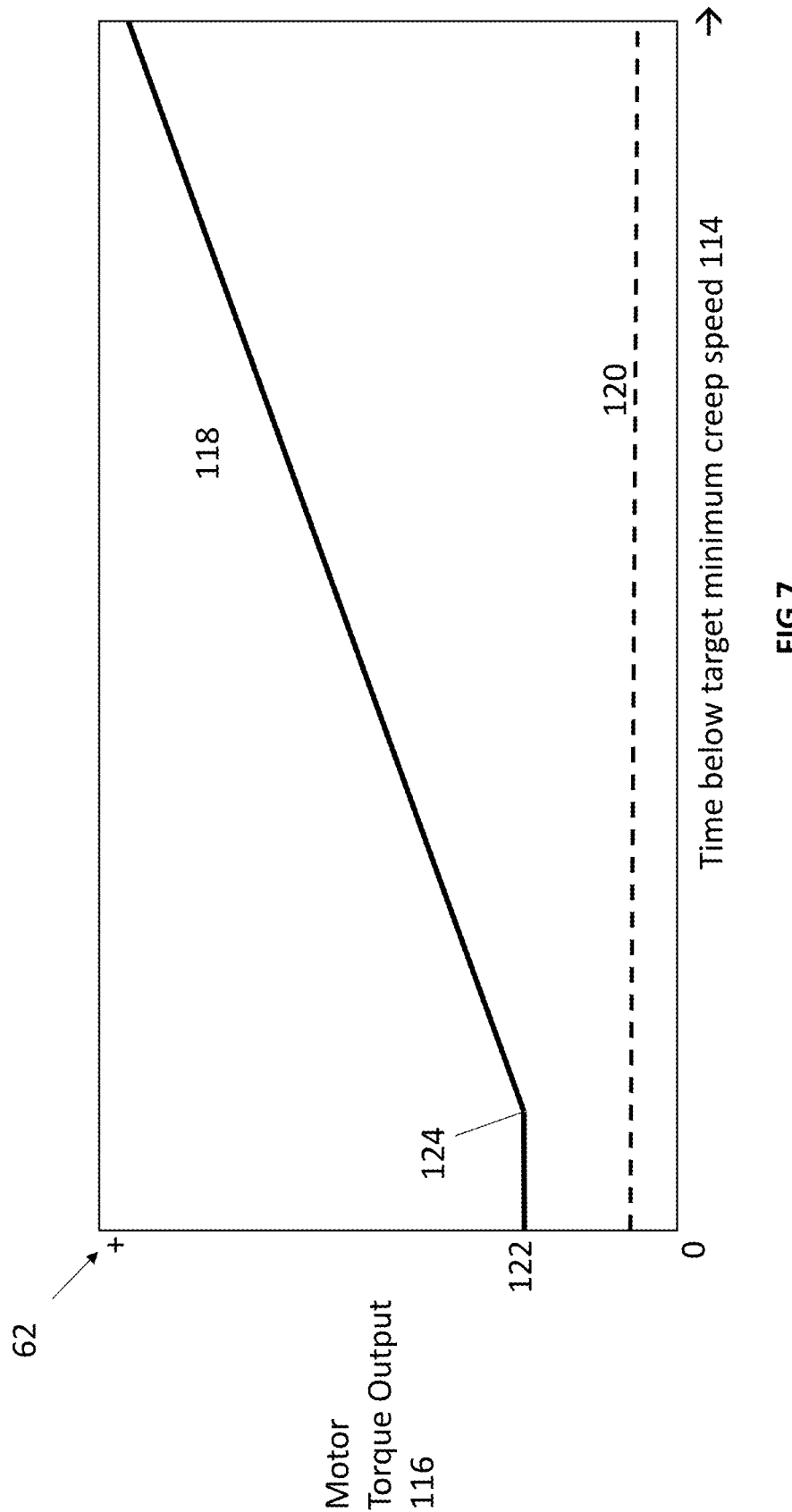
FIG. 7 shows an example mapping for obstacle compensation torque based on a comparison of actual vehicle speed to expected creep speed over a predicted time.

FIG. 7 illustrates the fifth algorithm profile 62 of eTelligent LO mode control algorithm 44. FIG. 7 shows an example of torque output profiles for obstacle compensation torque. Obstacles may be in the line of the vehicle travel and include items such as logs, curbs, ruts, bumps, holes, etc. that require additional power provided to ground engaging wheels 20 or 30 to be overcome. Obstacle compensation torque algorithm 62 evaluates a time below a target minimum creep speed 114 and adjusts motor output torque 116 accordingly when in eTelligent LO mode, shown via profile 118. For comparison, during normal operation, shown via profile 120, no adjustment of motor output torque 116 is made based on the amount of sub-minimum creep time 114, and motor output torque 116 is constant and flat. When in eTelligent LO mode, shown via profile 118, the motor output torque 116 is provided at given value at point 122 when time is zero. This is the base motor output torque 116 or creep torque provided in the eLO mode shown via profile 118. When the electric vehicle 10 encounters an obstacle that is not easily traversed with the provided motor output torque 116 at point 122, the vehicle's speed reduces, and the vehicle operates at a below target minimum creep speed, and time progresses at the below target speed. A counter or other mechanism determines the time below the target minimum creep speed 114 and, at point 124 corresponding to a predetermined amount of progressed time, the motor output torque 116 increases higher than the initial torque output of point 122, to attempt to cause electric vehicle 10 to overcome the obstacle. If successful, and the minimum creep speed is obtained, the counter will reset to zero and motor output torque 116 will return to the value provided at point 122. If the creep speed continues to be below target and the time continues to progress, the motor output torque 116 will continue to increase as the counter and time increases, with the expectation that a higher motor output torque 116 will be successful in overcoming the obstacle. Also, a driver's input to the accelerator pedal can be utilized to increase motor output torque 116 in a similar manner, although the purpose of algorithm 62 is to reduce needed input by the driver to overcome most easily traversed obstacles in an off-road terrain to allow the driver to focus on the trail ahead.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. Such variations are not to be regarded as a departure from the disclosure, and all such modifications are intended to be included within the scope of disclosure. It should be appreciated the mappings provided for the preceding algorithm profiles are graphical representations which do not represent the only characteristics and relationships between the eTelligent LO and normal operating modes that could be utilized. Further adjustments including the rate of change, starting and ending points, transition points, and relative value of difference between the modes are fully adjustable based on the needs to provide the electric vehicle with the best possible performance and should be only taken as examples to further explain the concepts described.

What is claimed is:

1. A method of operating an electric vehicle in both a normal operating mode and an electric low range operating mode for traversing off-road terrain, the method comprising:
    operating an electric vehicle having electric propulsion in a normal operating mode;
    in the normal operating mode, receiving, at a control unit, first sensor inputs from one or more vehicle sensors, and providing a first motor torque in response to the first sensor inputs according to the normal operating mode;
    activating a low range control algorithm and operating in an electric low range mode;
    in the electric low range mode, receiving, at the control unit, second sensor inputs from the one or more vehicle sensors, and providing a second motor torque in response to the second sensor inputs according to the low range control algorithm;
    wherein, for a common given value of the first and second sensor inputs, the second motor torque is different in the electric low range mode relative to the first motor torque for providing improved control of the electric vehicle while traversing off-road terrain;
    wherein the first and second sensor inputs each comprise a vehicle creep speed with the accelerator and the brake pedal non-actuated, wherein, when the vehicle speed is zero, the second motor torque of the electric low range mode is higher than the first motor torque of the normal operating mode;
    wherein as the vehicle speed increases from zero, the second motor torque and the first motor torque decrease, wherein the second motor torque decreases at a greater rate than the first motor torque;
    wherein the second motor torque of the electric low range mode is zero at a second vehicle speed, and the first motor torque of the normal operating mode is zero at a first vehicle speed, wherein the second vehicle speed is lower than the first vehicle speed.

2. The method of claim 1, wherein the second motor torque is negative at a further speed that is greater than the second vehicle speed.

3. A method of operating an electric vehicle in both a normal operating mode and an electric low range operating mode for traversing off-road terrain, the method comprising:
    operating an electric vehicle having electric propulsion in a normal operating mode;
    in the normal operating mode, receiving, at a control unit, first sensor inputs from one or more vehicle sensors, and providing a first motor torque in response to the first sensor inputs according to the normal operating mode;
    activating a low range control algorithm and operating in an electric low range mode;
    in the electric low range mode, receiving, at the control unit, second sensor inputs from the one or more vehicle sensors, and providing a second motor torque in response to the second sensor inputs according to the low range control algorithm;
    wherein, for a common given value of the first and second sensor inputs, the second motor torque is different in the electric low range mode relative to the first motor torque for providing improved control of the electric vehicle while traversing off-road terrain;

wherein the first and second sensor inputs comprise a vehicle speed that is below a predetermined minimum creep speed and a time period of the vehicle speed being below the predetermined minimum creep speed, wherein the second motor torque of the electric low range mode is greater than the first motor torque of the normal operating mode from the beginning of the time period and throughout the time period.

4. The method of claim 3, wherein as the time increases beyond a threshold time and the vehicle speed remains below the predetermined minimum creep speed, the second motor torque of the electric low range mode increases.

5. The method of claim 4, wherein as the time increases and the vehicle speed remains below the predetermined minimum creep speed, the first motor torque of the normal operating mode remains constant.

6. A method of operating an electric vehicle in both a normal operating mode and an electric low range operating mode for traversing off-road terrain, the method comprising:

operating an electric vehicle having electric propulsion in a normal operating mode;

in the normal operating mode, receiving, at a control unit, first sensor inputs from one or more vehicle sensors, and determining a maximum allowable first motor torque in response to the first sensor inputs according to the normal operating mode;

activating a low range control algorithm and operating in an electric low range mode;

in the electric low range mode, receiving, at the control unit, second sensor inputs from the one or more vehicle sensors, and determining a second maximum allowable motor torque in response to the second sensor inputs according to the low range control algorithm;

wherein, for a given accelerator pedal position and a common given value of the first and second sensor inputs, the second allowable motor torque is greater in the electric low range mode relative to the first allowable motor torque for providing improved control of the electric vehicle while traversing off-road terrain;

wherein the first and second sensor inputs comprise brake pedal travel, wherein second allowable motor torque remains constant from an off position of the brake pedal through a first range of travel in the low range mode, wherein the second allowable motor torque decreases as brake pedal travel increases beyond the first range of travel in the low range mode, and wherein the first allowable motor torque decreases from the off position through a first range of travel in the normal operating mode at first rate, wherein the first allowable motor torque decreases beyond the end of the first range of travel in the normal operating mode at a second rate that is less than the first rate.

7. A method of operating an electric vehicle in both a normal operating mode and an electric low range operating mode for traversing off-road terrain, the method comprising:

operating an electric vehicle having electric propulsion in a normal operating mode;

in the normal operating mode, receiving, at a control unit, first sensor inputs from one or more vehicle sensors, and determining a maximum allowable first motor torque in response to the first sensor inputs according to the normal operating mode;

activating a low range control algorithm and operating in an electric low range mode;

in the electric low range mode, receiving, at the control unit, second sensor inputs from the one or more vehicle sensors, and determining a second maximum allowable motor torque in response to the second sensor inputs according to the low range control algorithm;

wherein, for a given accelerator pedal position and a common given value of the first and second sensor inputs, the second allowable motor torque is greater in the electric low range mode relative to the first allowable motor torque for providing improved control of the electric vehicle while traversing off-road terrain;

further comprising maintaining the second allowable motor torque through the first range of travel during actuation of both the brake pedal and the accelerator simultaneously.

8. The method of claim 7, wherein the first and second sensor inputs each comprise an accelerator pedal travel, wherein the second motor torque of the electric low range mode is lower than the first motor torque of the normal operating mode for a common accelerator pedal travel value of the first and second sensor inputs.

9. The method of claim 8, wherein, in the normal operating mode, as the accelerator pedal travel increases, the first motor torque output increases at a first rate.

10. The method of claim 9, wherein, in the electric low range mode, as the accelerator pedal travel increases, the second motor torque output increases at a second rate through a first range of travel, wherein the second rate is less than the first rate, and the second motor torque output increases through a second range of travel at a third rate that is greater than the second rate and less than the first rate.

11. The method of claim 10, wherein the first, second, and third rates are linear.

12. The method of claim 7, wherein the first and second sensor inputs comprise a grade of the terrain, wherein as the grade increases, the second motor torque of the electric low range mode increases.

13. The method of claim 12, wherein as the grade increases, the first motor torque of the normal operating mode remains constant.

14. The method of claim 13, wherein the first motor torque and the second motor torque are the same when the grade is zero, wherein the first motor torque and the second motor torque are each greater than zero and comprise a creep torque.

15. The method of claim 13, wherein when the grade is negative the second motor torque is negative, and as the absolute value of the negative grade increases the absolute value of the second motor torque increases.

* * * * *